United States Patent
Shah et al.

(10) Patent No.: US 11,558,387 B2
(45) Date of Patent: Jan. 17, 2023

(54) VALIDATION OF APPROVER IDENTIFIERS IN A CLOUD COMPUTING ENVIRONMENT

(71) Applicant: International Business Machines Corporation, Armonk, NY (US)

(72) Inventors: Hiren Ramlal Shah, Highland, NY (US); Galina Gorelik, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 16/274,590

(22) Filed: Feb. 13, 2019

(65) Prior Publication Data
US 2020/0259837 A1    Aug. 13, 2020

(51) Int. Cl.
*H04L 9/40* (2022.01)
*H04L 67/30* (2022.01)
(Continued)

(52) U.S. Cl.
CPC ........ *H04L 63/102* (2013.01); *H04L 61/4541* (2022.05); *H04L 63/08* (2013.01);
(Continued)

(58) Field of Classification Search
CPC ... H04L 61/1541; H04L 63/08; H04L 63/101; H04L 63/102; H04L 63/105; H04L 67/30; H04L 67/32
See application file for complete search history.

(56) References Cited

U.S. PATENT DOCUMENTS 6,832,202 B1 * 12/2004 Schuyler .............. G06Q 40/025
                                                       705/7.26
8,291,377 B2    10/2012 Snover et al.
(Continued)

FOREIGN PATENT DOCUMENTS

WO        2016195759 A1    12/2016

OTHER PUBLICATIONS

Langford, "Implementing Least Privilege at your Enterprise", SANS Institute 2003. https://www.giac.org/paper/gsec/3116/implementing-privilege-enterprise/105168. pp. 22.

*Primary Examiner* — Thomas J Dailey
(74) *Attorney, Agent, or Firm* — Cantor Colburn LLP; Teddi Maranzano

(57) ABSTRACT

Examples of techniques for validation of approver identifiers in a cloud computing environment are described herein. An aspect includes receiving, by a processor, a template that defines a plurality of actions to be performed by the processor. Another aspect includes determining for a first action of the plurality of actions whether the template specifies a first user identifier under which to run the first action. Another aspect includes, based on determining that the template specifies the first user identifier, determining whether the template specifies a second user identifier to approve running of the first action under the first user identifier. Another aspect includes, based on determining that the template specifies the second user identifier to approve running of the first action under the first user identifier, validating whether the second user identifier has permission to approve the running of the first action under the first user identifier.

15 Claims, 7 Drawing Sheets

(51) Int. Cl.
*H04L 61/4541* (2022.01)
*H04L 67/60* (2022.01)

(52) U.S. Cl.
CPC .......... *H04L 63/101* (2013.01); *H04L 67/30* (2013.01); *H04L 67/60* (2022.05); *H04L 63/105* (2013.01)

(56) References Cited

U.S. PATENT DOCUMENTS

| | | |
|---|---|---|
| 9,015,790 B2 | 4/2015 | Pal et al. |
| 9,197,670 B2 | 11/2015 | Kwok |
| 9,516,504 B2 | 12/2016 | Schmitt |
| 9,830,145 B2 | 11/2017 | Huang |
| 2004/0003071 A1* | 1/2004 | Mathew ................ H04L 63/101 709/223 |
| 2011/0191217 A1* | 8/2011 | Saiu ................... G06Q 10/1091 705/30 |
| 2013/0239166 A1* | 9/2013 | MacLeod ............ G06F 21/6218 726/1 |
| 2018/0167273 A1 | 6/2018 | Buzzetti et al. |

\* cited by examiner

VALIDATION OF APPROVER IDENTIFIERS IN A CLOUD COMPUTING ENVIRONMENT

BACKGROUND

The present techniques relate to cloud computing. More specifically, the techniques relate to validation of approver identifiers (IDs) in a cloud computing environment.

Provisioning generally relates to configuring, managing, and providing computing software resources and/or computing services. In the context of a cloud provisioning environment, a cloud provider can configure, provide, and manage computing software resources and/or services that are allocated to a user. Software resources and services are provisioned to users by providing the users with instantiations (i.e., instances) of the software resources and services.

SUMMARY

According to an embodiment described herein, a system can include a processor to receive a template that defines a plurality of actions to be performed by the processor. The processor may also determine for a first action of the plurality of actions whether the template specifies a first user identifier under which to run the first action. The processor may also, based on determining that the template specifies the first user identifier to run the first action, determine whether the template specifies a second user identifier to approve running of the first action under the first user identifier. The processor may also, based on determining that the template specifies the second user identifier to approve running of the first action under the first user identifier, validate whether the second user identifier has permission to approve the running of the first action under the first user identifier.

According to another embodiment described herein, a method can include receiving, by a processor, a template that defines a plurality of actions to be performed by the processor. The method may also include determining, by the processor, for a first action of the plurality of actions whether the template specifies a first user identifier under which to run the first action. The method may also include, based on determining that the template specifies the first user identifier to run the first action, determining, by the processor, whether the template specifies a second user identifier to approve running of the first action under the first user identifier. The method may also include, based on determining that the template specifies the second user identifier to approve running of the first action under the first user identifier, validating, by the processor, whether the second user identifier has permission to approve the running of the first action under the first user identifier.

According to another embodiment described herein, a computer program product can include a computer-readable storage medium having program instructions embodied therewith, wherein the computer-readable storage medium is not a transitory signal per se, the program instructions readable by a processor system to cause the processor system to perform a method including receiving a template that defines a plurality of actions to be performed by a processor. The method may also include determining for a first action of the plurality of actions whether the template specifies a first user identifier under which to run the first action. The method may also include, based on determining that the template specifies the first user identifier to run the first action, determining whether the template specifies a second user identifier to approve running of the first action under the first user identifier. The method may also include, based on determining that the template specifies the second user identifier to approve running of the first action under the first user identifier, validating whether the second user identifier has permission to approve the running of the first action under the first user identifier.

DETAILED DESCRIPTION

Figure 1:
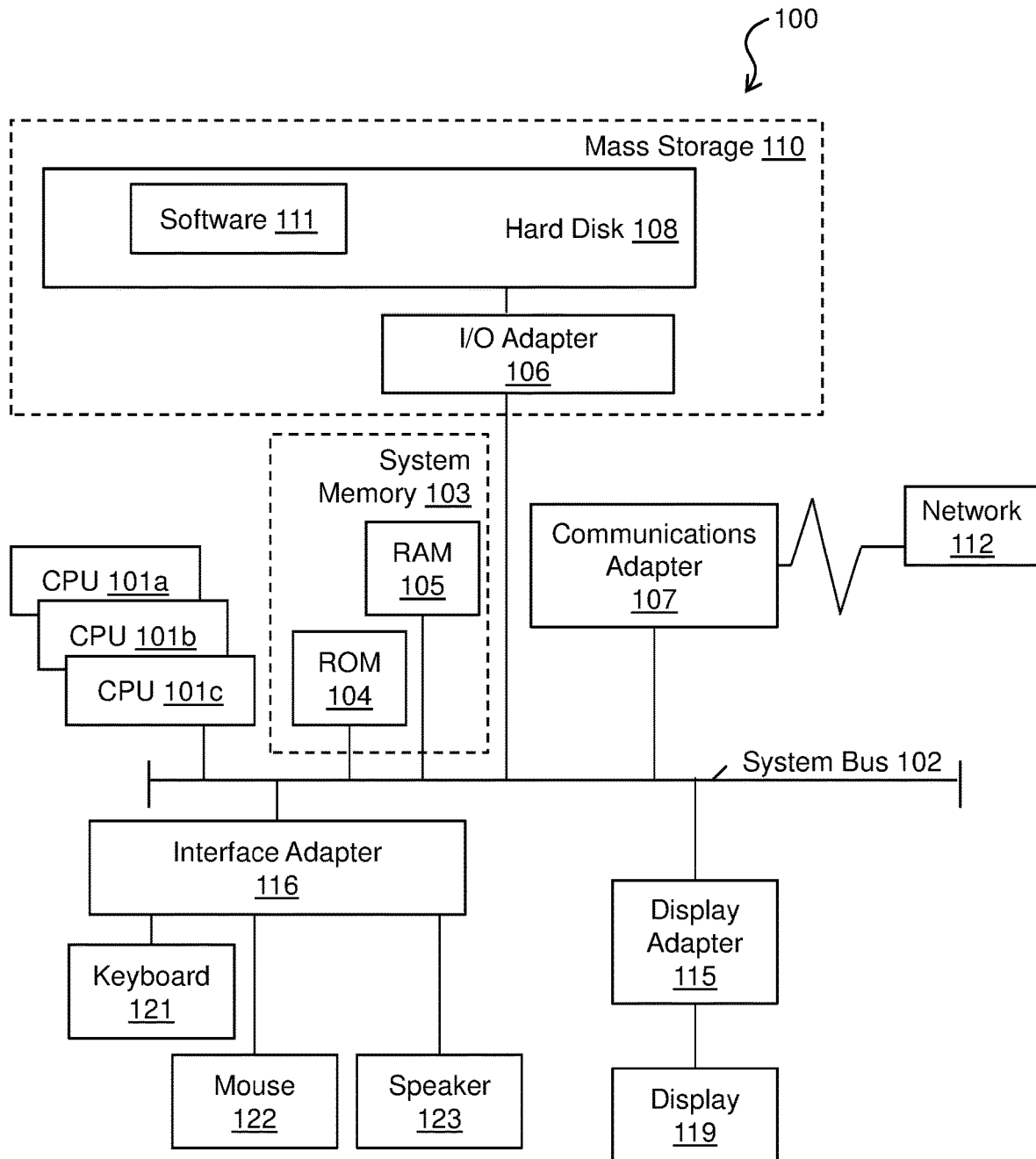
FIG. 1 is a block diagram of an example computer system for validation of approver identifiers in a cloud computing environment.

Embodiments of validation of approver identifiers (IDs) in a cloud computing environment are provided, with exemplary embodiments being discussed below in detail. A template may define a set of actions, or tasks, to be performed for a cloud provisioning process. An action in a template may include a specified privileged user ID (e.g., runAsUser) under which the action needs to be processed. The use of a privileged user ID may require approval by an approver ID before the user ID may perform an action. The template may also specify an approver ID for an action. The privileged user ID and approver ID elements may be defined for an action by provisioning extensible markup language (XML) in the template that defines the cloud provisioning process. A validation process may be used to determine whether a particular approver ID has sufficient permissions to approve the user ID to perform a particular action. Validation requirements may be applied in order to ensure that the approver ID complies with the use of the privileged user ID. If an approver ID does not satisfy the requirements, a security administrator of the cloud computing environment may be notified that the user ID needs approval before the action is performed.

In some embodiments, if the specified approver ID is an exact match of the privileged user ID, or if the approver ID has equivalent capabilities to the privileged user ID, then the approver is validated as being able to authorize use of the user ID as runAsUser. If neither of those conditions is met and the provisioning template does not contain an approval record for a security administrator, then an approval record for the security administrator may be automatically generated and added to the template. The approval record ensures that an appropriate approver is aware of the provisioning template and has agreed with the usage of the privileged user IDs.

In a first example, a template may specify for a particular an action that the runAsUser user ID is IBMUSER, and the approver user ID is ZOSMFAD1. ZOSMFAD1 does not have any capabilities. ZOSMFAD1 also does not match IBMUSER and does not have equivalent capabilities to IBMUSER. Therefore, ZOSMFAD1 does not satisfy the security requirements to approve the use of IBMUSER as the runAsUser for the action, and is not validated as an approver ID. An approval record may be generated to notify a security administrator of the system, because the security administrator needs to approve IBMUSER as the runAsUser before the particular action may be processed as IBMUSER.

In a second example, a template may specify for a particular action that the runAsUser user ID is IBMUSER, and the approver user ID is ZOSMFAD2. In this example, ZOSMFAD2 has equivalent capabilities to IBMUSER. Because ZOSMFAD2 does not match IBMUSER but does have equivalent capabilities to IBMUSER, ZOSMFAD2 is validated as satisfying the security requirement to approve the use of IBMUSER as runAsUser for the action, so no additional approval is required.

In a third example, a template may specify for a particular action that the runAsUser user ID is IBMUSER, and the approver user ID is also IBMUSER. In this example, the approver user ID matches the runAsUser ID. Therefore, IBMUSER is validated as satisfying the security requirement to approve the use of IBMUSER as runAsUser for the action, so no additional approval is required.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular actions or implement particular abstract data types. Computer system 100 may be practiced in distributed cloud computing environments where actions are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
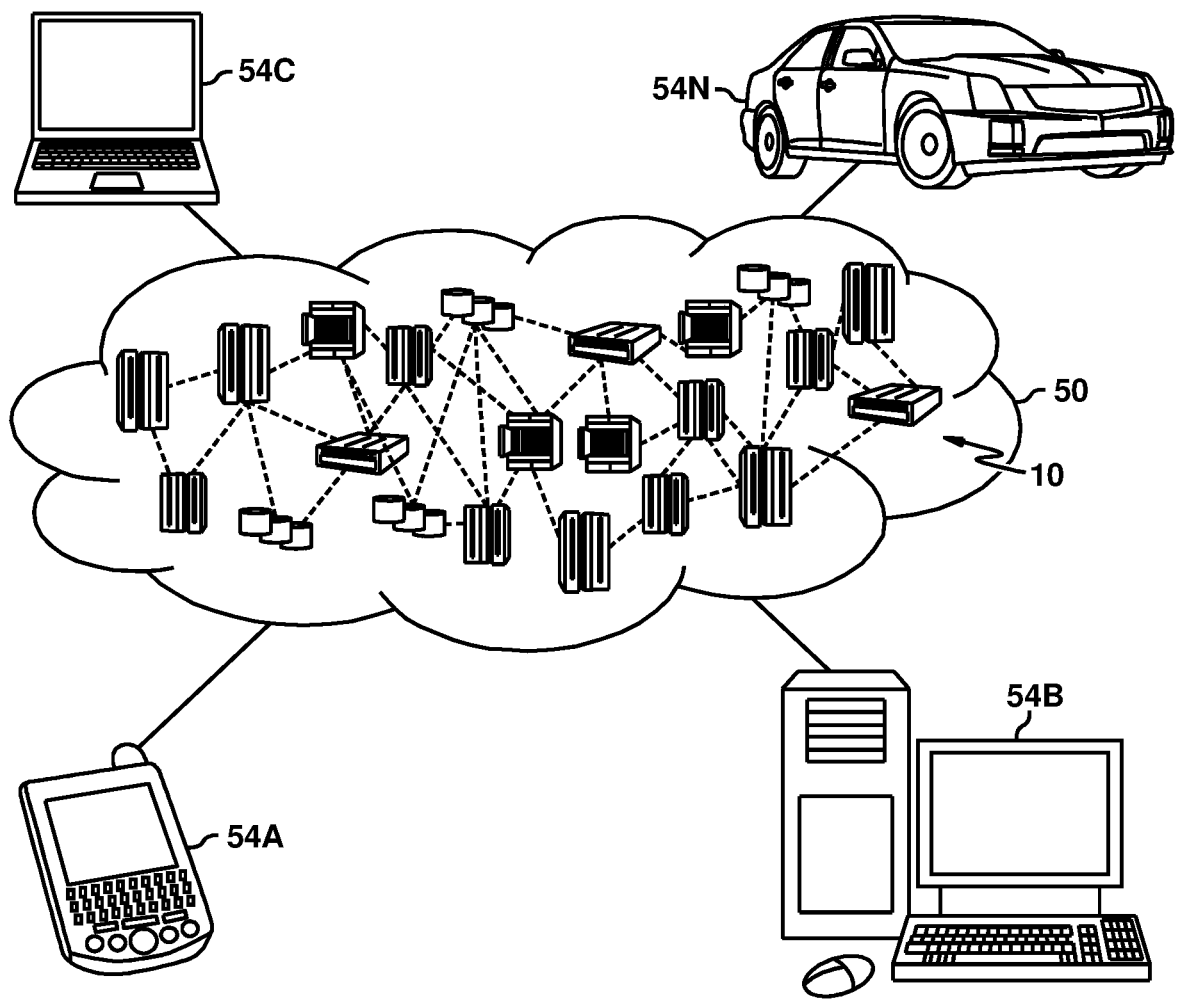
FIG. 2 depicts a cloud computing environment according to an embodiment of the present invention.

Referring now to FIG. 2, illustrative cloud computing environment 50 is depicted. Cloud computing environment 50 may include one or more computer systems such as computer system 100 of FIG. 1. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
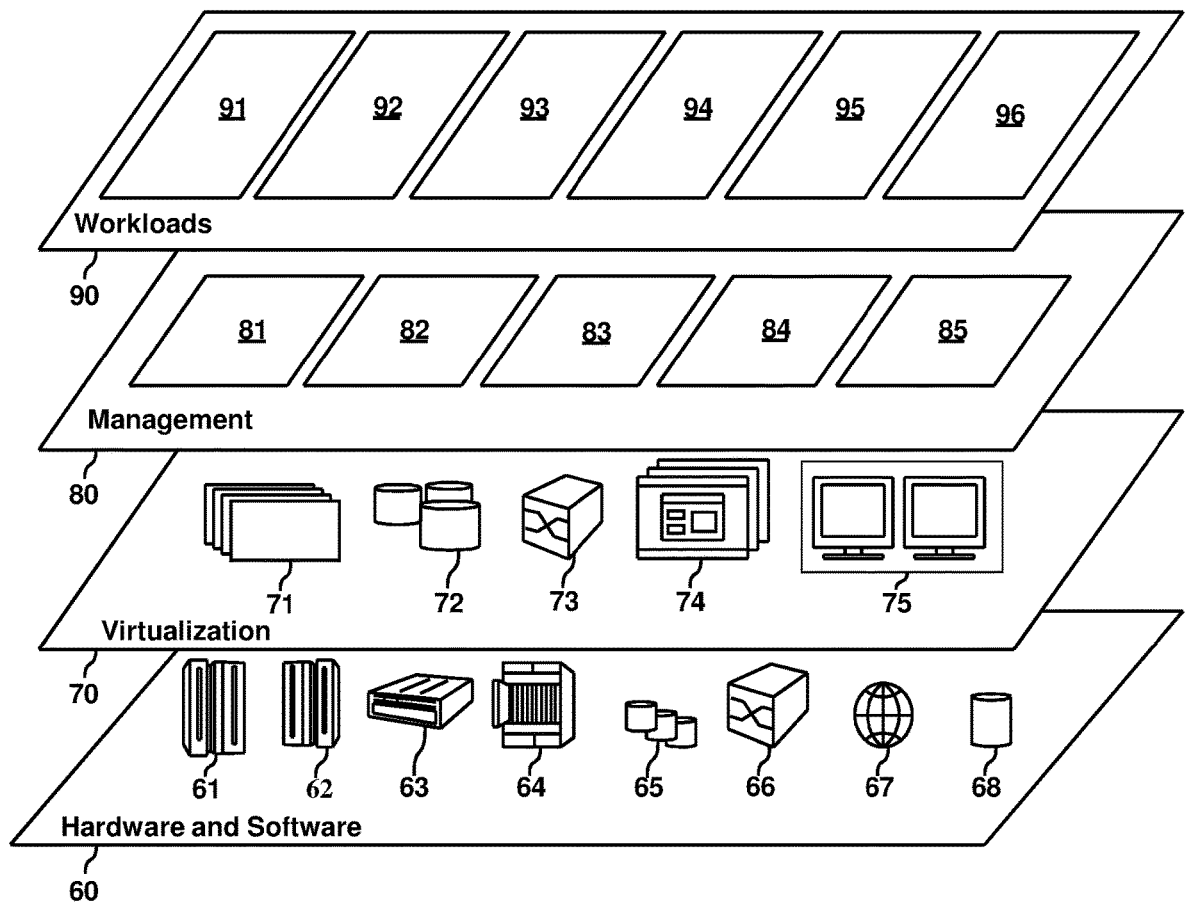
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform actions within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and actions that are performed in management layer 80, as well as protection for data and other resources. Embodiments of validation of approver identifiers may be implemented in conjunction with security in the management layer 80. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document hosting and editing 96. Any appropriate workload may be provided in workloads layer 90.

Figure 4:
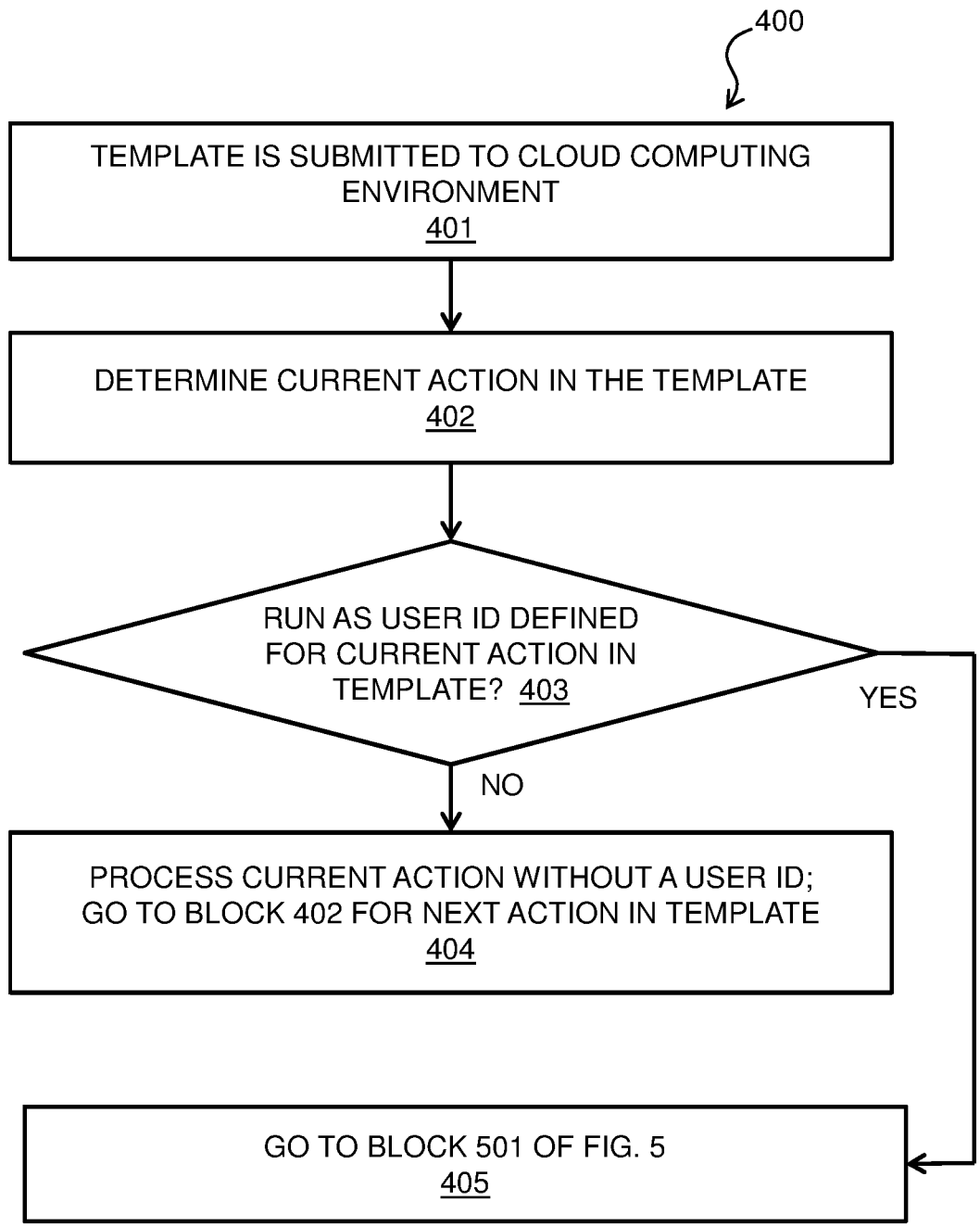
FIG. 4 is a process flow diagram of an example method validation of approver identifiers in a cloud computing environment.

FIG. 4 is a process flow diagram of an example method for validation of approver identifiers in a cloud computing environment. The method 400 can be implemented with any suitable computing device, such as the computer system 100 of FIG. 1, in a cloud computing environment such as cloud computing environment 50 of FIG. 2. For example, the template may be received and processed by management layer 80 of FIG. 3. In block 401, a template, which may include definitions of a plurality of actions, or tasks, to be executed as part of a provisioning process, is submitted to a cloud computing environment. In some embodiments, the template may be an XML document. Each action in the template may have a plurality of defined characteristics, including but not limited to a user ID under which the action is to be run (e.g., a runAsUser ID) and/or an approver ID for the user ID. In some embodiments, the template may correspond to the embodiments of a template that are described in U.S. Patent Application Publication 2018/0167273 (application Ser. No. 15/377,354, to Buzzetti et al.), filed on Dec. 13, 2016, which is herein incorporated by reference in its entirety. Next, in block 402, a current action is determined in the template that was received in block 401. Method 400 of FIG. 4 may be repeated for each of the plurality of actions in the template; in an initial iteration of method 400 of FIG. 4, the current action may be a first action that is listed in the template. In block 403, it is determined whether the current action will be run under a particular user ID (e.g., whether a runAsUser is defined for the current action in the template). If it is determined in block 403 that the current action will not be run under a specified user ID, flow proceeds from block 403 to block 404, in which the current action is processed without a user ID. Then, if there is another action in the template that has not yet been processed, flow proceeds from block 404 back to block 402 of method 400 of FIG. 4 for the next action in the template, i.e., the next action in the template becomes the current action. If there are no further unprocessed actions left in the template at block 404 of FIG. 4, the processing of the template is complete, and method 400 ends.

If it was determined in block 403 that the current action will be run as a particular user ID (e.g., a runAsUser is defined for the current action in the template), flow proceeds from block 403 to block 405. In block 405, processing of the current action proceeds to block 501 of method 500 of FIG. 5, which is discussed in further detail below.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
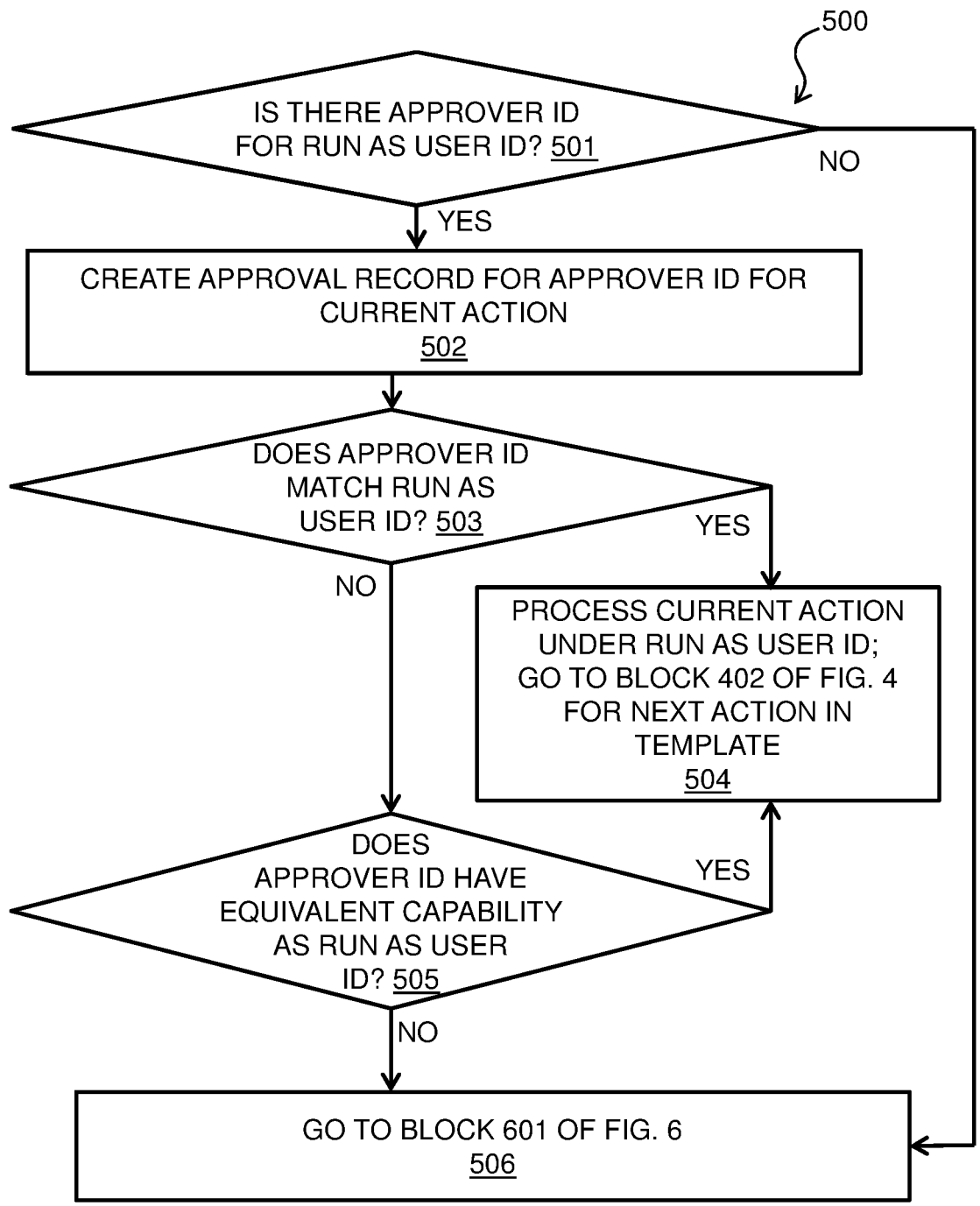
FIG. 5 is a process flow diagram of another example method for validation of approver identifiers in a cloud computing environment.

FIG. 5 is a process flow diagram of an example method for validation of approver identifiers in a cloud computing environment. The method 500 can be implemented with any suitable computing device, such as the computer system 100 of FIG. 1, in a cloud computing environment such as cloud computing environment 50 of FIG. 2. In block 501 of method 500 of FIG. 5, it is determined whether an approver ID is specified for the user ID (e.g., the runAsUser ID) of the current action in the template. If it is determined in block 501 that there is not an approver ID specified in the template for the user ID for the current action, flow proceeds to block 506. In block 506 of method 500, processing of the current action proceeds to block 601 of method 600 of FIG. 6, which is discussed in further detail below.

If it was determined in block 501 that there is an approver ID specified in the template for the user ID for the current action, flow proceeds to block 502. In block 502, an approval record is created for the approver ID. The approval record may cause a person associated with the approver ID to be notified that that current action is to be run under the user ID. The approval record may include information such as when an action was approved, and by whom. Then, in block 503, it is determined whether the approver ID matches the user ID for the current action, e.g., whether the approver ID and the user ID are the same. If it is determined in block 503 that the approver user ID matches the user ID for the current action, it is determined that the approver ID is valid, so flow proceeds from block 503 to block 504. In block 504, the current action is processed under the user ID. Then, if there is a next action in the template that has not yet been processed, flow proceeds from block 504 of FIG. 5 back to block 402 of method 400 of FIG. 4 for the next action in the template, i.e., the next action in the template becomes the current action for a subsequent execution of method 400 of FIG. 4. If there are no further unprocessed actions left in the template at block 504 of FIG. 5, the processing of the template is complete, and method 500 ends.

If it was determined in block 503 that the approver ID does not match the user ID for the current action, flow proceeds from block 503 to block 505. In block 505, it is determined whether the approver ID has equivalent capabilities to the user ID. The capabilities of a user ID may include authorization of the user ID to access specific information and/or authorization to run specific services in the cloud computing environment. If it is determined in block 505 that the approver ID has equivalent capabilities to the user ID, it is determined that the approver ID is valid, and flow proceeds from block 505 to block 504. In block 504, the current action is processed under the user ID. Then, if there is a next action in the template that has not yet been processed, flow proceeds from block 504 back to block 402 of method 400 of FIG. 4 for the next action in the template, i.e., the next action in the template becomes the current action for a subsequent execution of method 400 of FIG. 4. If there are no further unprocessed actions left in the template at block 504 of FIG. 5, the processing of the template is complete, and method 500 ends.

If it was determined in block 505 that the approver ID does not have equivalent capabilities to the user ID, flow proceeds from block 505 to block 506. In block 506, processing of the current action proceeds to block 601 of method 600 of FIG. 5 which is discussed in further detail below.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
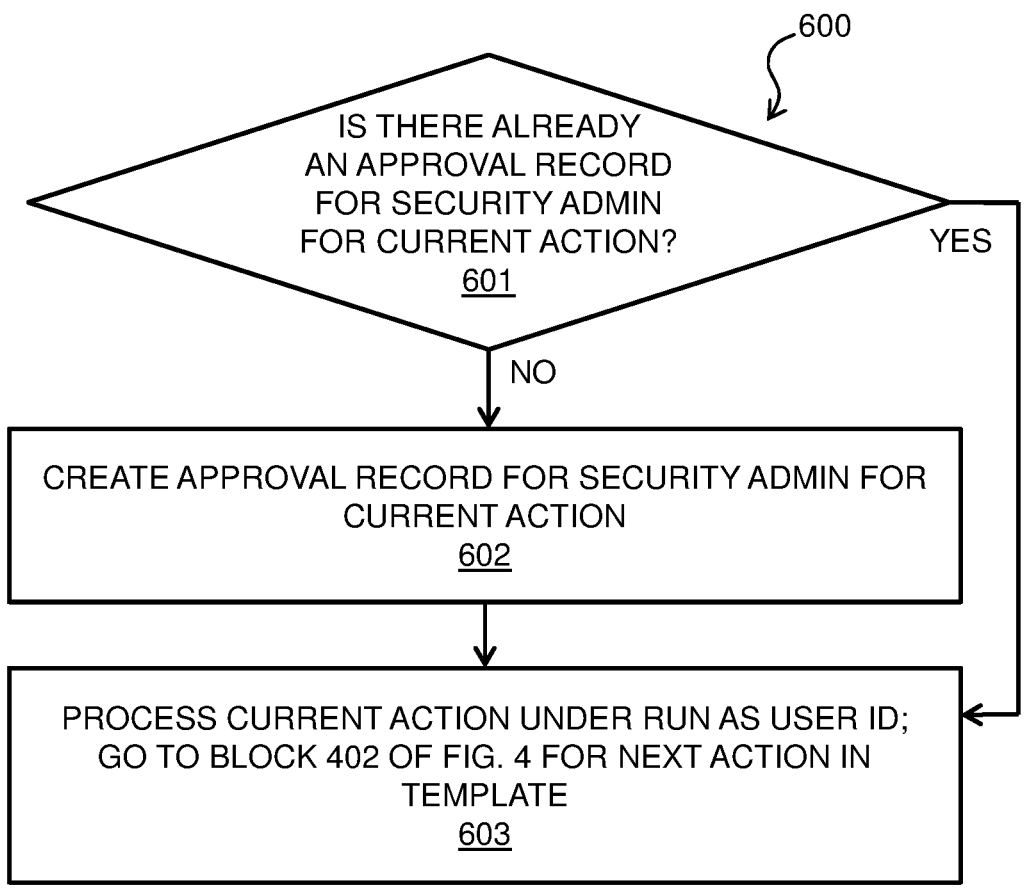
FIG. 6 is a process flow diagram of an example method for ensuring valid approvers are present in a cloud computing environment.

FIG. 6 is a process flow diagram of an example method for ensuring valid approvers are present in a cloud computing environment. In the method 600 that is shown in FIG. 6, the automatic creation of a new approval record for a security administrator, which may be performed based on the approval identifiers lacking the required authorization to approve the usage of the run as user identifier, as was determined in block 505 of FIG. 5, is illustrated. The method 600 can be implemented with any suitable computing device, such as the computer system 100 of FIG. 1, in a cloud computing environment such as cloud computing environment 50 of FIG. 2. In block 601 of FIG. 6, it is determined whether there is already an approval record for a security administrator for the current action. For example, an approval record for a security administrator of the cloud computing environment may be defined for the entire template. The approval record may include information such as when an action was approved, and by whom. If it is determined in block 601 that there is not already an approval record for a security administrator for the current action, flow proceeds from block 601 to block 602, in which an approval record is created for a security administrator for the current action. The approval record may cause a person who is authorized as a security administrator of the cloud computing environment to be notified before the current action can be run under the user ID. Then flow proceeds to block 603. In block 603, the current action is processed under the user ID. Then, if there is a next action in the template that has not yet been processed, flow proceeds from block 603 back to block 402 of method 400 of FIG. 4 for the next action in the template, i.e., the next action in the template becomes the current action for a subsequent execution of method 400 of FIG. 4. If there are no further unprocessed actions left in the template at block 603 of FIG. 6, the processing of the template is complete, and method 600 ends.

If it is determined in block 601 that there is already an approval record for a security administrator for the current action, flow proceeds from block 601 to block 603. In block 603, the current action is processed under the user ID. Then, if there is a next action in the template that has not yet been processed, flow proceeds from block 603 back to block 402 of method 400 of FIG. 4 for the next action in the template, i.e., the next action in the template becomes the current action for a subsequent execution of method 400 of FIG. 4. If there are no further unprocessed actions left in the template at block 603 of FIG. 6, the processing of the template is complete, and method 600 ends.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7:
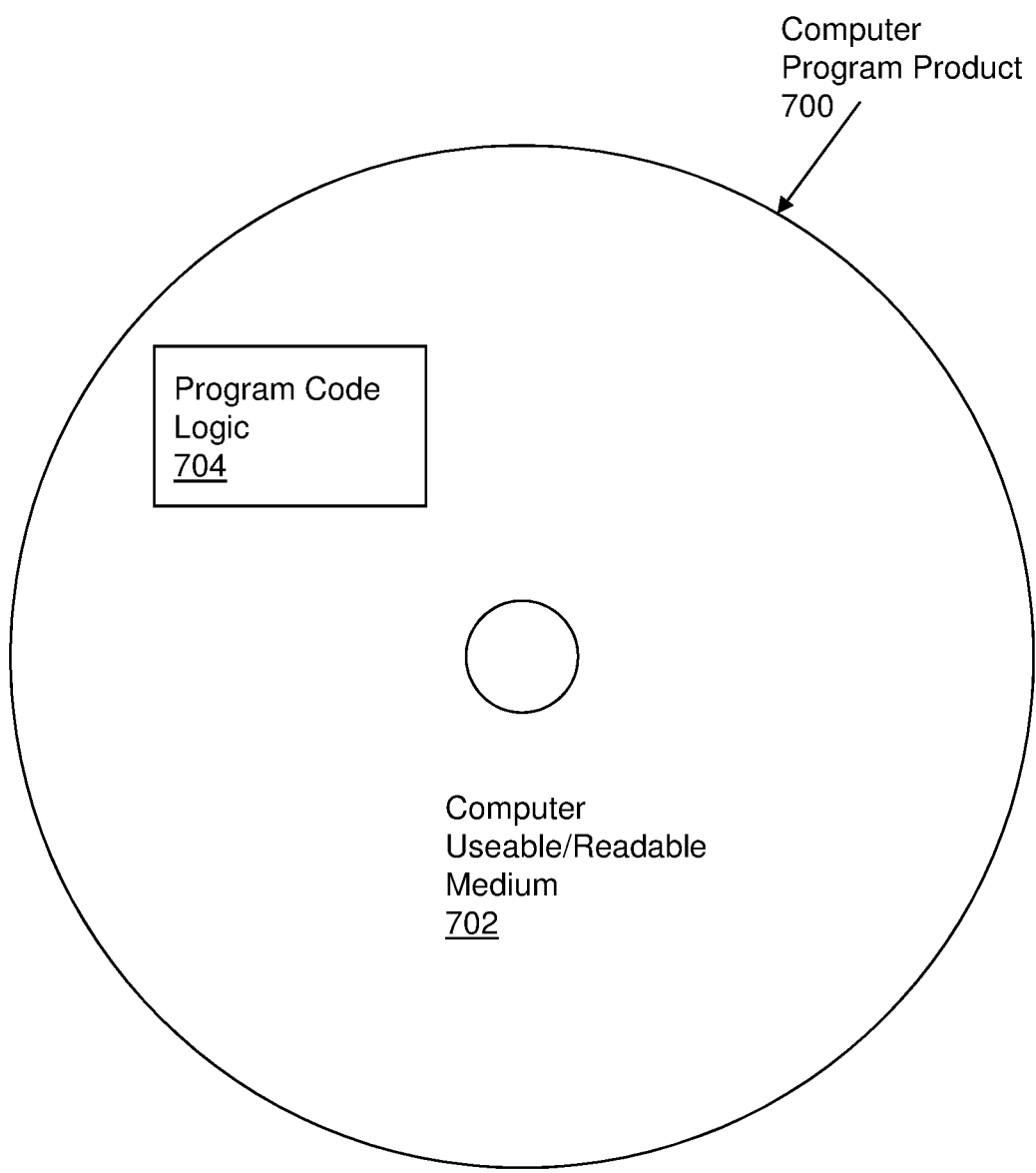
FIG. 7 is a block diagram of an example computer readable medium for validation of approver identifiers in a cloud computing environment.

Referring now to FIG. 7, a computer program product 700 in accordance with an embodiment that includes a computer-readable storage medium 702 and program instructions 704 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions. These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks. The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive, by the processor, a template that defines a plurality of actions to be performed by the processor, wherein a first action of the plurality of actions includes a privileged identifier under which to run the first action and an approver identifier to approve running of the first action under the privileged identifier;
   receive, by the processor from a first user, a request to execute the template; and
   validate whether the first user has permission to approve the running of the first action under the privileged identifier by:
   creating an approval record for the approver identifier for the first action, wherein creation of the approval record causes a notification that the first action is to be run under the privileged identifier to be sent to an individual associated with the approver identifier;

determining whether a first user identifier of the first user matches the approver identifier;

based on determining that the first user identifier matches the approver identifier, processing the first action under the privileged identifier;

based on determining that the first user identifier does not match the approver identifier, determining whether the first user identifier has equivalent capabilities to the approver identifier; and based on determining that the first user identifier has equivalent capabilities to the approver identifier, processing the first action under the privileged identifier.

2. The system of claim 1, wherein based on determining that the template does not specify a privileged identifier to run the first action, the processor is further configured to process the first action without a user identifier.

3. The system of claim 1, wherein validating whether the approver identifier has permission to approve running of the first action under the first user identifier comprises:

based on determining that the first user identifier does not have equivalent capabilities to the approver identifier, determining whether there is an approval record for a security administrator for the first action; and based on determining that there is not an approval record for the security administrator for the first action, creating an approval record for the security administrator for the first action.

4. The system of claim 3, wherein based on creating the approval record for the security administrator for the first action, the processor is further configured to process the first action under the privileged identifier.

5. The system of claim 1, wherein the processor is further configured to, based on determining that the template does not specify a approver identifier to approve running of the first action under the privileged identifier:

determine whether there is an approval record for a security administrator for the first action;

based on determining that there is not an approval record for the security administrator for the first action, creating an approval record for the security administrator for the first action; and based on creating the approval record for the security administrator for the first action, processing the first action under the privileged identifier.

6. A computer-implemented method, comprising:

receiving, by a processor, a template that defines a plurality of actions to be performed by the processor, wherein a first action of the plurality of actions includes a privileged identifier under which to run the first action and an approver identifier to approve running of the first action under the privileged identifier;

receiving, by the processor from a first user, a request to execute the template; and validating, by the processor, whether the first user identifier has permission to approve the running of the first action under the privileged identifier by:

creating an approval record for the approver identifier for the first action, wherein creation of the approval record causes a notification that the first action is to be run under the privileged identifier to be sent to an individual associated with the approver identifier;

determining whether a first user identifier of the first user matches the approver identifier;

based on determining that the first user identifier matches the approver identifier, processing the first action under the privileged identifier;

based on determining that the first user identifier does not match the approver identifier, determining whether the first user identifier has equivalent capabilities to the approver identifier; and based on determining that the first user identifier has equivalent capabilities to the approver identifier, processing the first action under the privileged identifier.

7. The computer-implemented method of claim 6, further comprising:

based on determining that the template does not specify a privileged identifier to run the first action, processing the first action without a user identifier.

8. The computer-implemented method of claim 6, wherein validating whether the approver identifier has permission to approve running of the first action under the privileged identifier comprises:

based on determining that the first user identifier does not have equivalent capabilities to the approver identifier, determining whether there is an approval record for a security administrator for the first action; and based on determining that there is not an approval record for the security administrator for the first action, creating an approval record for the security administrator for the first action.

9. The computer-implemented method of claim 8, further comprising:

based on creating the approval record for the security administrator for the first action, processing the first action under the privileged identifier.

10. The computer-implemented method of claim 6, further comprising, based on determining that the template does not specify a approver identifier to approve running of the first action under the privileged identifier:

determine whether there is an approval record for a security administrator for the first action;

based on determining that there is not an approval record for the security administrator for the first action, creating an approval record for the security administrator for the first action; and based on creating the approval record for the security administrator for the first action, processing the first action under the privileged identifier.

11. A computer program product comprising:

a computer-readable storage medium having program instructions embodied therewith, wherein the computer-readable storage medium is not a transitory signal per se, the program instructions readable by a processor system to cause the processor system to perform a method comprising:

receiving a template that defines a plurality of actions to be performed by a processor, wherein a first action of the plurality of actions includes a privileged identifier under which to run the first action and an approver identifier to approve running of the first action under the privileged identifier;

receiving, by the processor from a first user, a request to execute the template; and validating whether the first user has permission to approve the running of the first action under the privileged identifier by:

creating an approval record for the approver identifier for the first action, wherein creation of the approval record causes a notification that the first action is to be run under the privileged identifier to be sent to an individual associated with the approver identifier;

determining whether a first user identifier of the first user matches the approver identifier;

based on determining that the first user identifier matches the approver identifier, processing the first action under the privileged identifier;

based on determining that the first user identifier does not match the approver identifier, determining whether the first user identifier has equivalent capabilities to the approver identifier; and based on determining that the first user identifier has equivalent capabilities to the approver identifier, processing the first action under the privileged identifier.

12. The computer program product of claim 11, wherein the method further comprises:

based on determining that the template does not specify a privileged identifier to run the first action, processing the first action without a user identifier.

13. The computer program product of claim 11, wherein validating whether the first user identifier has permission to approve running of the first action under the privileged identifier comprises:

based on determining that the first user identifier does not have equivalent capabilities to the approver identifier, determining whether there is an approval record for a security administrator for the first action; and based on determining that there is not an approval record for the security administrator for the first action, creating an approval record for the security administrator for the first action.

14. The computer program product of claim 13, wherein the method further comprises:

based on creating the approval record for the security administrator for the first action, processing the first action under the privileged identifier.

15. The system of claim 1, wherein the capabilities include an authorization of the first user identifier to access specific information and to run specific services.

* * * * *